June 22, 1954     W. J. SAVENKOFF     2,681,535
LIGHT ROD WEEDING ASSEMBLY
Filed June 20, 1952
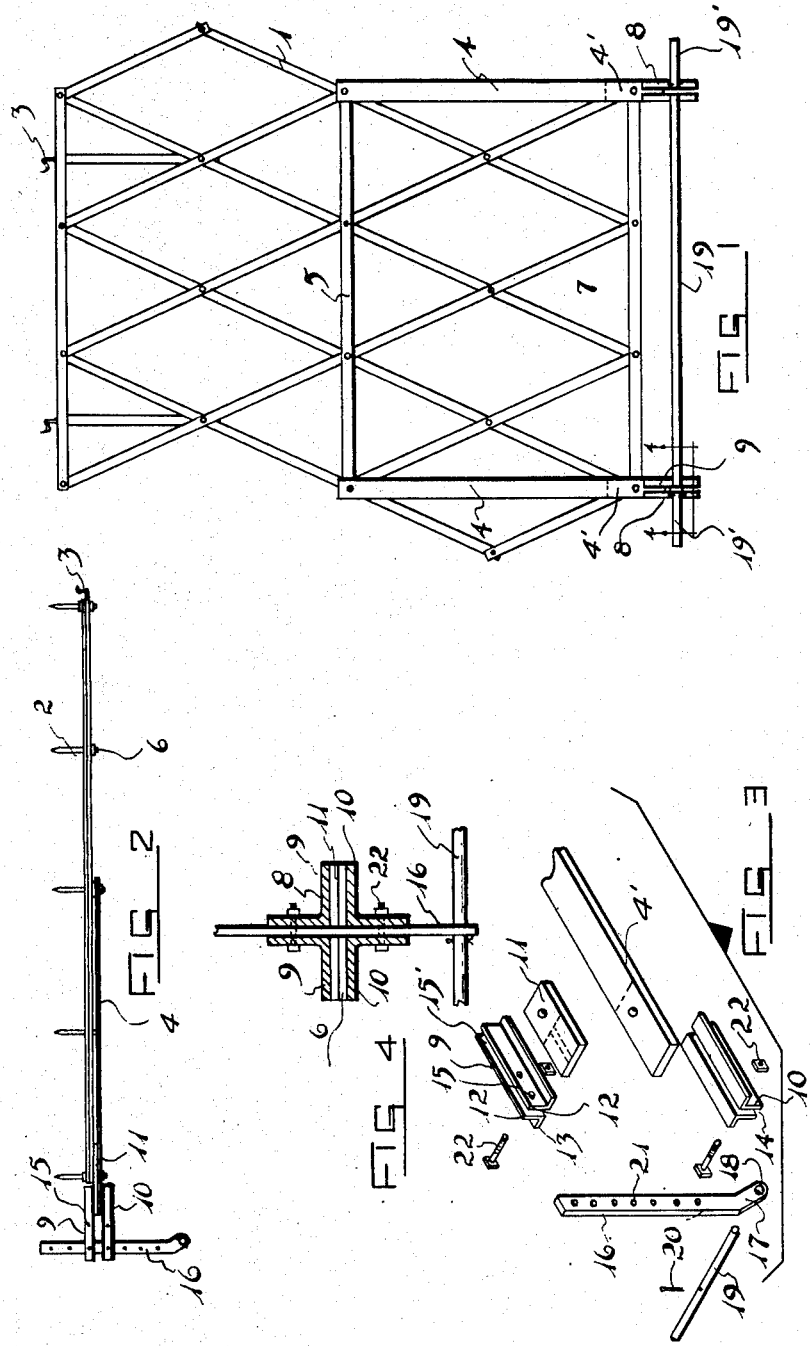
INVENTOR:
WILLIAM J. SAVENKOFF.
HIS ATTYS.

Patented June 22, 1954

2,681,535

UNITED STATES PATENT OFFICE 2,681,535

LIGHT ROD WEEDING ASSEMBLY

William J. Savenkoff, Pelly, Saskatchewan, Canada

Application June 20, 1952, Serial No. 294,678

2 Claims. (Cl. 55—3)

1

My invention relates to new and useful improvements in rod weeder assemblies particularly in relatively light rod weeding assemblies adapted to be used primarily upon fields that have already been sown, an object of my invention being to provide a device of the character herewithin described which is adapted to be secured upon the upper surface of a conventional diagonal drag harrow section, it being understood that when used as a rod weeder, the section is reversed so that the upper surface thereof engages the ground.

A further object of my invention is to provide a device of the character herewithin described which is readily attachable to drag harrow sections and which may remain in situ without interfering to the conventional action of the drag harrow section.

A yet further object of my invention is to provide a device of the character herewithin described which includes means whereby the vertical relationship of the weeding rod may be varied simply and rapidly.

Still another object of my invention is to provide a device of the character herewithin described which includes means whereby the individual weeding rod on adjacent harrow sections do not interfere one with the other.

Still another object of my invention is to provide a device of the character herewithin described which is simple in construction, economical in operation, and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a top plan view of a conventional diagonal harrow section with my device in situ, it being understood that the harrow is in its normal working position.

Figure 2 is substantially a side elevation of Figure 1 but reversed so that the rod weeding assembly is in position for use.

Figure 3 is an enlarged perspective exploded view of one of the rod weeder standard support brackets and rod weeder standard.

Figure 4 is an enlarged cross-sectional fragmentary view substantially along the lines 4—4 of Figure 1.

In the drawings like characters of reference indicate corresponding parts in the different figures.

It is well known that a conventional diagonal drag harrow is an excellent levelling and weed killing device particularly when used upon weeds of relatively small character. However, this supplement cannot be used effectively upon fields that have already been seeded particularly if the seed has commenced germination but it is at this time that weeding should take place in order to eliminate the second crop of weeds particularly wild buck wheat and the like.

Alternatively a conventional rod weeding implement may be used after seeding but there again, due to the conventional construction of such implements, it does not follow the contour of the land readily due to the excessive weight thereof inasmuch as it tends to cut deeply into the high spots of a cultivated field while leaving the low spots untouched.

Therefore I have designed the light rod weeder attachment to a conventional harrow section hereinafter to be described which permits the operator to rod weed the field once or twice after seeding thus destroying all newly started weeds and leaving the crop entirely undamaged. This also permits the operator to seed earlier than usual as it is not quite so essential to allow sufficient time for 100% germination of these seeds to take place and thus be eliminated before seeding.

Proceeding now to describe my invention in detail it will be seen upon reference to the accompanying drawings that I have illustrated a conventional diagonal drag harrow section 1 including harrow points 2 and carrying connections 3, all of which are conventional.

Secured upon the upper side and towards the rear of the harrow section is a pair of shoes 4 one upon each side of the section spanned by a bracing member 5 and it will be appreciated that these members 4 and 5 may be secured to the harrow by means of the conventional stud 6 projecting upwardly from the harrow point 2.

The rear ends 4 of the shoes extend rearwardly slightly beyond the rearmost extremity 7 of the harrow section and are provided with rod weeder standard support (collectively designated 8). These brackets, which are shown in detail in Figures 3 and 4, comprise an upper pair of angle members 9 and a lower pair of angle members 10. The upper pair 9 consist of a pair of relatively short length of angle iron facing outwardly and being secured to an attaching plate 11 as by welding or the like, so that the vertical flanges 12 thereof are in spaced parallel relationship and reference to Figure 3 will show that these members are secured to the attaching plate 11 along the lines indicated in phantom so that the rear ends 13 of the members 9 extend rearwardly beyond the plate 11. The lower pair of angle members 10 are also situated in parallel spaced relationship and facing outwardly and are secured to the under side of the rear end of the member or shoe 4 as by welding or the like so that the space 14 therebetween is immediately below and in alignment with the space 15 between the upper pair of angle members. Both pairs of angle members 9 and 10 are provided with horizontal drillings 15' so that the rod weeder standard 16 may be secured and held between the two pairs of angle members either in the rearmost position as shown in Figure 2 or forwardly by a few inches by the engagement of the front apertures. The standards 16 consist of elongated members, the lower ends 17 of which are angulated forwardly and apertured as at 18 to provide bearing support for a weeding rod 19 extending therethrough and in this connection the weeding rod 19 is maintained in position by means of cotter pins 20. The standards 16 are apertured as at 21 and these apertures may be aligned with the apertures 15 within the angle members so that the standard may be varied as regards their vertical relationship and be secured in the desired position by means of bolts and nuts 22.

In operation, the rod weeding assembly is secured to the upper side of the harrow 1 as shown in Figure 1 whereupon the harrow can be used conventionally. However, when it is desired to use the rod weeding assembly, the harrow section is reversed as shown in Figure 2 and the vertical position of the weeding rod 19 is adjusted by means of the standards 16 to the desired depth whereupon the harrow section may be drawn over the ground and it is to be appreciated that the relative light weight and flexibility of conventional harrow sections permits the rod 19 to follow the contour of the land extremely closely. Furthermore, the light weight of the harrow does not interfere with the planted seed as the harrow itself does not penetrate the surface.

In conclusion I would like to refer back to the two apertures 15 provided in the angle members which permit the rods 19 to be staggered in adjacent sections of harrow in a horizontal plain to avoid the extending ends 19' of the rods interfering one with the other.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A light rod weeding assembly comprising in combination with a diagonal drag harrow section, a pair of parallel shoes secured to the upper surface of said drag harrow section and extending rearwardly therefrom, a rod weeder standard support bracket secured to the rear end of each of said shoes, rod weeder standards held by said support brackets and a weeding rod spanning said standard, said drag harrow section being reversed for use as said rod weeding assembly, said rod weeder standard support brackets comprising an upper section and a lower section, said upper section including a pair of angle members secured to an attaching plate, said pair of angle members facing outwardly and being spaced apart in parallel relationship, said attaching plate being secured to the rear end of one of said shoes, said lower member also consisting of a pair of angle members facing outwardly and spaced apart in parallel relationship, said angle members being secured to the under side of said shoe and at the rear end thereof, said standard being held between said pairs of angle members and substantially at right angles thereto.

2. A light rod weeding assembly comprising in combination with a diagonal drag harrow section, a pair of parallel shoes secured to the upper surface of said drag harrow section and extending rearwardly therefrom, a rod weeder standard support bracket secured to the rear end of each of said shoes, rod weeder standards held by said support brackets and a weeding rod spanning said standard, said drag harrow section being reversed for use as said rod weeding assembly, said rod weeder standard support brackets comprise an upper section and a lower section, said upper section including a pair of angle members secured to an attaching plate, said pair of angle members facing outwardly and being spaced apart in parallel relationship, said attaching plate being secured to the rear end of one of said shoes, said lower member also consisting of a pair of angle members facing outwardly and spaced apart in parallel relationship, said angle members being secured to the under side of said shoe and at the rear end thereof, said standard being held between said pairs of angle members and substantially at right angles thereto, said standard being held between said pairs of angle members and substantially at right angles thereto, said standard consisting of elongated members apertured along the length thereof for attachment between said angle iron members, said weeding rod being mounted at the lower end thereof.

References Cited in the file of this patent

UNITED STATES PATENTS

| Number | Name | Date |
|---|---|---|
| 198,538 | Du Perow | Dec. 25, 1877 |
| 1,531,643 | Brewer | Mar. 31, 1925 |
| 1,572,004 | Gaskill | Feb. 9, 1926 |
| 1,712,483 | Sutherland | May 14, 1929 |
| 1,724,143 | Penland | Aug. 13, 1929 |